United States Patent
Toda et al.

(10) Patent No.: US 10,081,327 B2
(45) Date of Patent: Sep. 25, 2018

(54) AUTOMOBILE AIRBAG DOOR

(71) Applicant: TOYODA GOSEI CO., LTD., Kiyosu-shi, Aichi-ken (JP)

(72) Inventors: Minoru Toda, Kiyosu (JP); Chiharu Totani, Kiyosu (JP); Shunta Asakuma, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 227 days.

(21) Appl. No.: 15/228,021

(22) Filed: Aug. 4, 2016

(65) Prior Publication Data

US 2017/0050607 A1 Feb. 23, 2017

(30) Foreign Application Priority Data

Aug. 21, 2015 (JP) .................................. 2015-163689

(51) Int. Cl.
*B60R 21/2165* (2011.01)
*B60R 21/205* (2011.01)

(52) U.S. Cl.
CPC ........ *B60R 21/2165* (2013.01); *B60R 21/205* (2013.01)

(58) Field of Classification Search
CPC .......................... B60R 21/205; B60R 21/2165
See application file for complete search history.

(56) References Cited

U.S. PATENT DOCUMENTS

| 7,100,941 B2* | 9/2006 | Riha ....................... B29C 59/16 280/728.3 |
| 8,132,307 B2* | 3/2012 | Aichner ................... B26D 3/08 29/91.1 |
| 8,480,121 B2 | 7/2013 | Horibe et al. |
| 2005/0062271 A1 | 3/2005 | Heckl et al. |
| 2011/0181028 A1* | 7/2011 | Brunet .................. B60R 21/206 280/728.3 |
| 2014/0110921 A1 | 4/2014 | Takahashi et al. |

(Continued)

FOREIGN PATENT DOCUMENTS

| JP | 2005-537164 A | 12/2005 |
| JP | 2006-230592 A | 9/2006 |

(Continued)

OTHER PUBLICATIONS

Office Action dated Jul. 3, 2018 issued in corresponding JP patent application No. 2015-163689 (and English translation).

*Primary Examiner* — Arti Singh-Pandey
(74) *Attorney, Agent, or Firm* — Posz Law Group, PLC

(57) ABSTRACT

An automobile airbag door includes a base member, a cover member, which is bonded to the surface of the base member, and a tear line, which is formed in the back side of the base member. The tear line is configured to be a starting point of tearing when the base member is pressed by an airbag being deployed and inflated. The cover member includes a three-dimensionally knitted cushion layer bonded to the surface of the base member and a covering bonded to the surface of the three-dimensionally knitted cushion layer. The three-dimensionally knitted cushion layer is made of a double-raschel knitted fabric. The base member includes at least one projection that is formed on the surface of the base member and arranged to be adjacent to the tear line.

4 Claims, 10 Drawing Sheets

(56) References Cited

U.S. PATENT DOCUMENTS

| | | | |
|---|---|---|---|
| 2014/0333052 A1* | 11/2014 | Fujita | B60R 21/2165 280/728.3 |
| 2015/0266432 A1* | 9/2015 | Fujita | B60R 13/0256 280/728.3 |
| 2016/0096502 A1 | 4/2016 | Takahashi et al. | |

FOREIGN PATENT DOCUMENTS

| | | |
|---|---|---|
| JP | 2008-230394 A | 10/2008 |
| JP | 2010-076704 A | 4/2010 |
| JP | 2014-101108 A | 6/2014 |

\* cited by examiner

Car Width Direction

Front ⟷ Rear

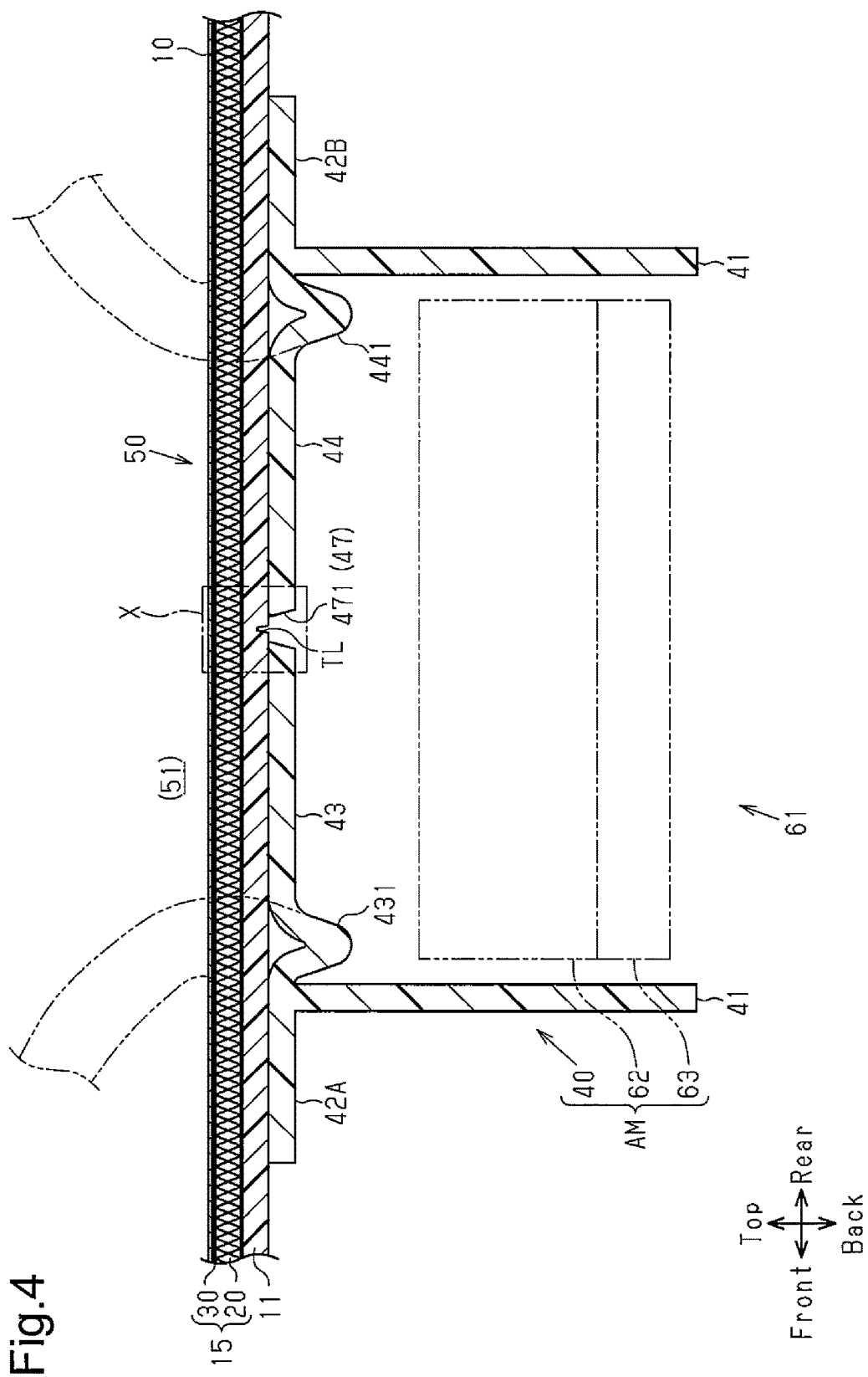

AUTOMOBILE AIRBAG DOOR

BACKGROUND OF THE INVENTION

The present invention relates to an automobile airbag door that is opened when torn by pressing force of an airbag being deployed and inflated.

Conventionally, an automobile is equipped with a front passenger seat airbag apparatus as a means for protecting the occupant on the front passenger seat (for example, refer to Japanese National Phase Laid-Open Patent Publication No. 2005-537164). In the front passenger seat airbag apparatus, a part of the instrument panel arranged in front of the front passenger seat of the automobile forms an airbag door. The airbag door includes a base member, which serves as a core member, and a cover member bonded to the surface of the base member. The cover member includes a cushion layer bonded to the surface of the base member and a covering bonded to the surface of the cushion layer. The covering includes a ground fabric layer and a covering layer bonded to the surface of the ground fabric layer.

Some airbag doors have a three-dimensionally knitted cushion layer, which is, for example, configured by double-raschel knitted fabric, to give elasticity to the airbag door, thereby improving the tactile sensation.

The airbag door has a tear line (a tearable line), which is formed by a plurality of short cleavage grooves or a single elongated cleavage groove and functions as the starting point of tearing leading to an opening action. The tear line allows the airbag door to be smoothly opened and the airbag to be smoothly deployed and inflated. To be inconspicuous from the surface side of the airbag door, the tear line is formed on the back side of the airbag door. For example, a tear line is formed in each of the base member and the cushion layer. In addition to the tear lines formed in the base member and the cushion layer, some airbag doors are also provided with a tear line formed in the back side of the covering.

When an impact is applied from the front to an automobile equipped with the above described front passenger seat airbag apparatus, for example, due to a frontal collision, the inflator supplies inflation gas to the airbag to deploy and inflate the airbag. The airbag in turn presses the airbag door, thereby tearing the base member and the cover member along the tear lines to open the airbag door. The airbag passes through the opening, which is formed by opening the airbag door, to be deployed and inflated between the instrument panel and the occupant seated on the front passenger seat, thereby reducing the impact applied to the occupant from the front.

In conventional airbag doors, a tear line is formed at least in the cushion layer in the cover member to allow the cover member to be torn along the tear line in the base member. This requires a step for forming a tear line at least in the cushion layer and a step for bonding the cushion layer to the surface of the base member such that the tear line in the base member and the tear line in the cushion member are aligned with each other. As a result, problems such as an increased number of manufacturing steps are brought about.

SUMMARY OF THE INVENTION

Accordingly, it is an objective of the present invention to provide an automobile airbag door that allows a cover member to be easily torn along a tear line in a base member when pushed by an airbag being deployed and inflated, without forming a tear line on the back side of the cover member.

To achieve the foregoing objective, an automobile airbag door is provided that includes a base member having a surface and a back side, a cover member, which is bonded to the surface of the base member, and a tear line formed in the back side of the base member. The tear line is configured to be a starting point of tearing when the base member is pressed by an airbag being deployed and inflated. The cover member includes a three-dimensionally knitted cushion fabric layer, which is bonded to the surface of the base member, and a covering, which is bonded to a surface of the three-dimensionally knitted cushion layer. The base member includes at least one projection, which is formed on the surface of the base member and arranged to be adjacent to the tear line.

BRIEF DESCRIPTION OF THE DRAWINGS

FIG. 4 is a partial cross-sectional view taken along line 4-4 of FIG. 3, illustrating the airbag apparatus.

DETAILED DESCRIPTION OF THE PREFERRED EMBODIMENTS

One embodiment will now be described with reference to FIGS. 1 to 10. In the following description, the advancing direction of the automobile is defined as a forward direction. The rearward, upward, downward, leftward, and rightward directions are defined with reference to the forward direction. Thus, the left-right direction agrees with the width direction of the automobile (car width direction).

Figure 1:
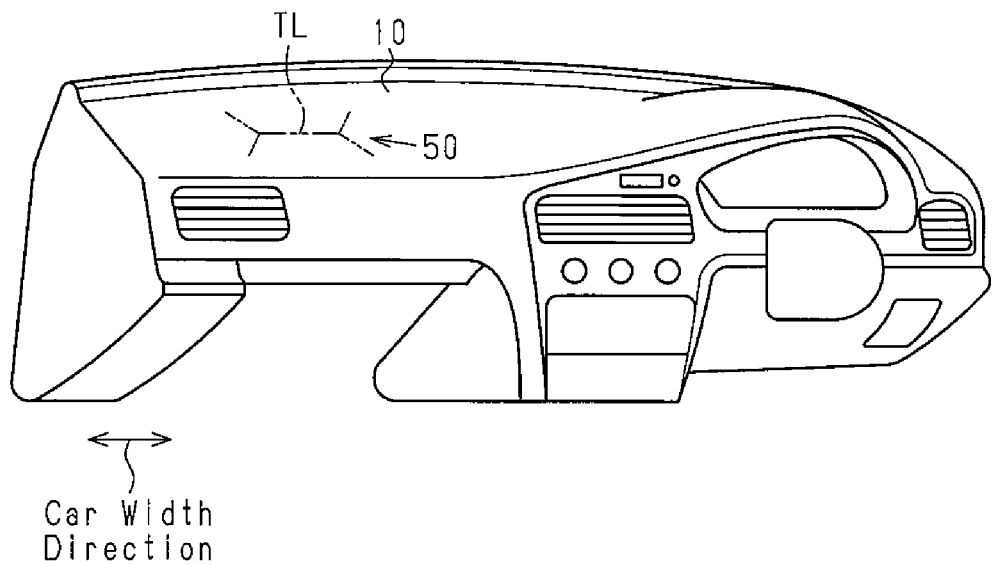
FIG. 1 is a diagram of an automobile airbag door according to one embodiment, showing a perspective view of an instrument panel in which a front passenger seat airbag apparatus is mounted.
Figure 2:
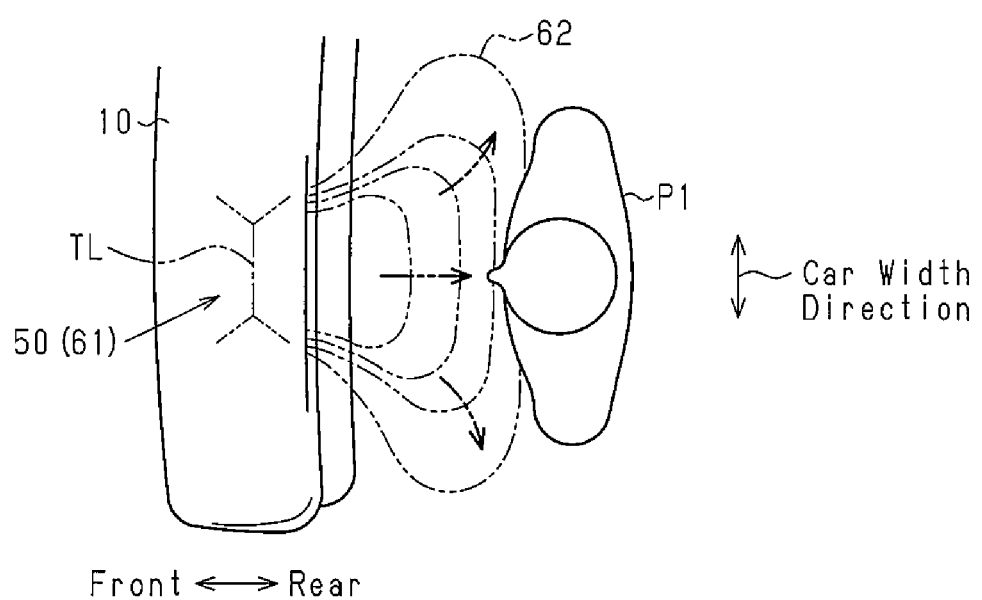
FIG. 2 is a schematic plan view showing a state of the front passenger seat airbag apparatus of the embodiment, illustrating a state in which the airbag is deployed and inflated to protect the occupant on the front passenger seat.

As shown in FIGS. 1 and 2, an automobile includes an instrument panel 10, which extends along the width of the automobile and is arranged forward of the driver's seat and the front passenger seat.

The automobile has a front passenger seat airbag apparatus (hereinafter, referred to as an airbag apparatus 61), which inflates and deploys an airbag 62 forward of an occupant P1 seated on the front passenger seat to protect the occupant P1 from an impact when the impact is applied from the front.

As shown in FIG. 4, the airbag apparatus 61 has an automobile airbag door (hereinafter, referred to as an airbag door 50), which is formed in a part of the instrument panel 10 forward of the front passenger seat, and an airbag module AM, which is located on the back side of the airbag door 50. When the airbag apparatus 61 is activated, the airbag door 50 is pressed by the airbag 62 being deployed and inflated and is opened toward the front passenger seat, thereby defining an opening 51, which allows the airbag 62 to be deployed.

<Regarding Basic Structure of Airbag Door 50>

Figure 5A:
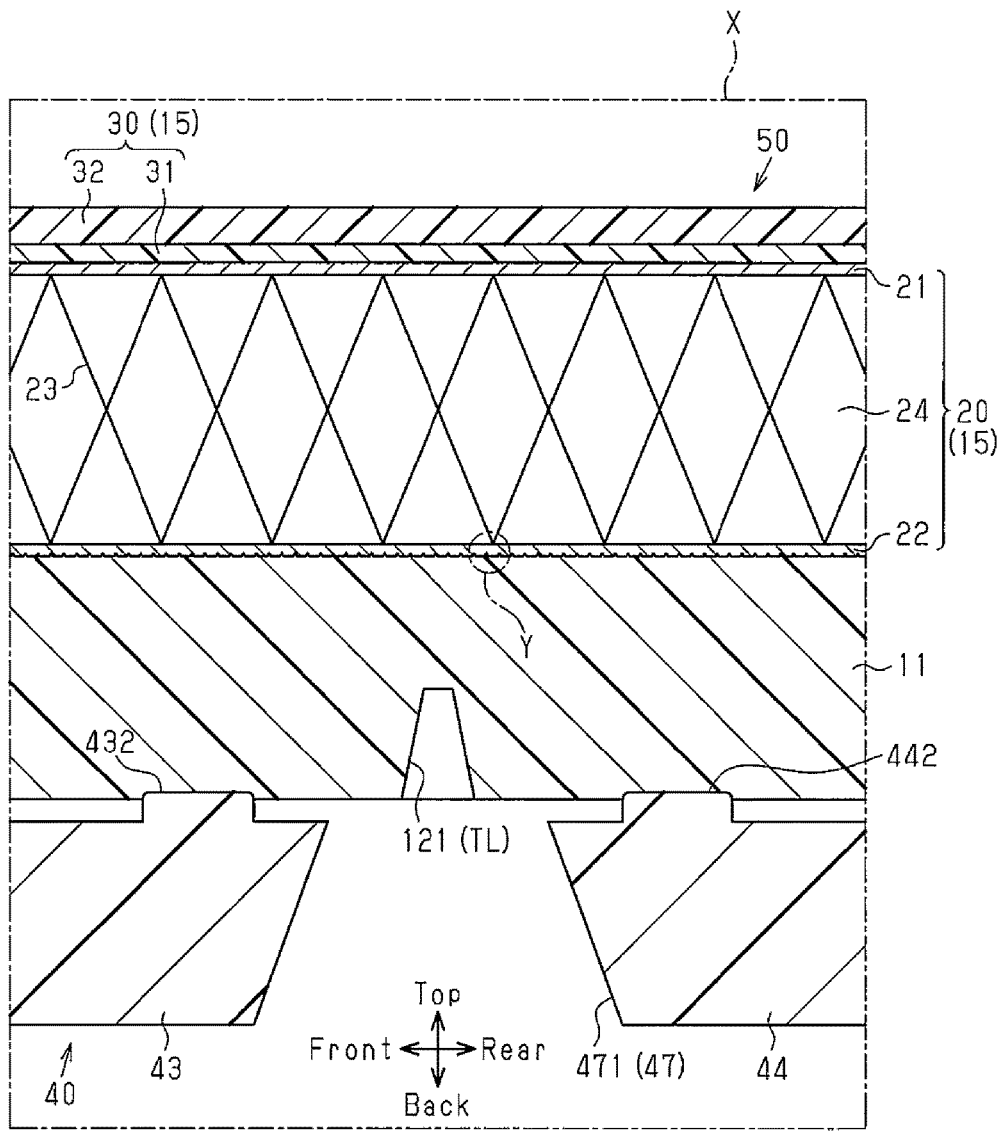
FIG. 5A is a partial cross-sectional view of section X of FIG. 4.

As shown in FIGS. 4 and 5A, the airbag door 50 includes a base member 11, which is a core member, and a cover member 15.

The base member 11 is made of a plastic such as thermoplastic olefin (TPO) or polypropylene by injection molding. The base member 11, for example, has a thickness of 2.5 to 3.5 mm.

As shown in FIG. 5A, the cover member 15 includes a three-dimensionally knitted cushion layer 20, which is bonded to the surface of the base member 11 with an adhesive, and a covering 30 bonded to the surface of the three-dimensionally knitted cushion layer 20.

The three-dimensionally knitted cushion layer 20 is used to give a required cushioning property (elasticity) to the airbag door 50, thereby improving the tactile sensation. The three-dimensionally knitted cushion layer 20 is, for example, configured by a three-dimensionally knitted fabric such as a double-raschel knitted fabric and is bonded to the surface of the base member 11.

The three-dimensionally knitted cushion layer 20 includes a top-side knitted fabric layer 21, a back-side knitted fabric layer 22, and a connection layer 24, and is formed by a double-raschel machine. The top-side knitted fabric layer 21 is structured by a single yarn and formed by planar and regularly arranged mesh pattern. The back-side knitted fabric layer 22 is structured by a single yarn and formed by planar and regularly arranged mesh pattern.

The top-side knitted fabric layer 21 and the back-side knitted fabric layer 22 are configured by yarns of synthetic fibers such as polyester fibers, polyamide fibers, acrylic fibers, and polypropylene fibers, natural fibers such as cotton, linen, and wool, and regenerated fibers such as cuprammonium rayon and lyocell.

The knitted fabric structures of the top-side knitted fabric layer 21 and the back-side knitted fabric layer 22 are not particularly limited, but may be a flat knitted fabric structure. The flat knitted fabric structure includes tricot knitting, cord knitting, or atlas knitting, which are three basic knit constructions of warp knitting. Alternatively, the knitted fabric structures of the top-side knitted fabric layer 21 and the back-side knitted fabric layer 22 may be a rectangular or hexagonal mesh structure, or marquisette-like knitted structure. The top-side knitted fabric layer 21 and the back-side knitted fabric layer 22 may have the same or difference knitted fabric structures.

The connection layer 24 is configured by connecting strands 23 that connect the top-side knitted fabric layer 21 and the back-side knitted fabric layer 22. The connecting strands 28 are configured by polytrimethylene terephthalate fibers, polyethylene terephthalate fibers, polybutylene terephthalate fibers, polyamide fibers, polyvinyl chloride fibers, or polyester-based elastomer fibers. In order to maintain a good long-lasting cushioning property after repetitive or long-time compressions of the three-dimensionally knitted cushion layer 20, it is preferable that polytrimethylene terephthalate fibers be used for at least a part of the connecting strands 23. The cross-sectional shape of the fibers preferably has a round cross-sectional shape in view of maintaining a good cushioning property for a long time. Further, monofilament yarns are preferably used for connecting strands 23 in view of restraining displacement force.

The connecting strands 23 may form loop-shaped stitches in the knitted fabrics of the top-side knitted fabric layer 21 and the back-side knitted fabric layer 22. Further, the connecting strands 23 may be hooked to both knitted fabric layers 21 and 22 using insertion stitches or tuck stitches. In particular, it is preferable that at least two connecting strands 23 inclined obliquely in opposite directions to connect the knitted fabric layers 21 and 22 in a crossing (X-shaped) structure or a truss structure in view of improving the shape stability of the cushion layer 20 and providing a favorable cushioning property. A truss structure is a structural form constituted by an aggregation of triangular basic units. Substantially triangular shapes are formed by the connecting strands 23 and the top-side knitted fabric layer 21 and by the connecting strands 23 and the back-side knitted fabric layer 22. In this case, each connecting strand 23 may be constituted by two threads in a crossing structure or a truss structure. Further, each connecting strand 23 may be constituted by a single thread, and the connecting strand 23 may be folded back at the top-side knitted fabric layer 21 and the back-side knitted fabric layer 22, resulting in a seemingly two-threaded structure.

Having no layered structure, the above described three-dimensionally knitted cushion layer 20 is excellent in breathability and cushioning property, for example. The thickness of the three-dimensionally knitted cushion layer 20 may be changed by adjusting the lengths of the connecting strands 23. In the present embodiment, the three-dimensionally knitted cushion layer 20 is formed to have a thickness of 2.5 mm or more.

Figure 6:
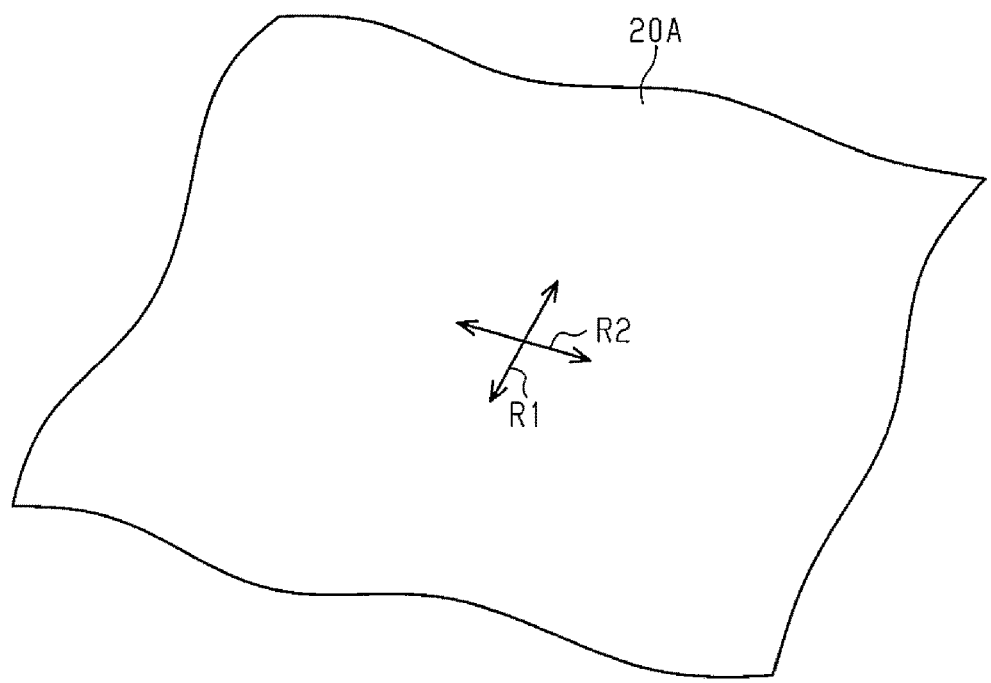
FIG. 6 is a diagram showing the anisotropy in the tensile strength of the three-dimensionally knitted cushion layer of the embodiment.

As shown in FIG. 6, an original fabric 20A of the three-dimensionally knitted cushion layer 20 has anisotropic tensile strength in directions along the surface. That is, the tensile strength of the original fabric 20A is set to be the smallest in a specific direction R1 along the surface and is set to be the greatest in another direction R2, which is perpendicular to the direction R1.

The cushion layer between the base member 11 and the covering 30 is constituted by the three-dimensionally knitted cushion layer 20 for the following reasons. That is, the three-dimensionally knitted cushion layer 20 has better stretchability and flexibility than a cushion layer made of woven fabric. Thus, compared to a cushion layer made of woven fabric, the three-dimensionally knitted cushion layer 20 improves the stretchability and flexibility of the covering 30. Compared to a case in which the cushion layer is formed of urethane foam, the three-dimensionally knitted cushion layer 20 improves the cushioning property and the tactile sensation of the airbag door 50. Further, if the three-dimensionally knitted cushion layer 20 is formed by an original fabric made of warp knitting, the fabric is stabilized.

As shown in FIG. 5A, the covering 30 is provided to improve the texture and tactile sensation of the airbag door 50 and is made of artificial leather in the present embodiment. The artificial leather of the covering 30 is constituted by a ground fabric layer 31 and a covering layer 32 bonded to the surface of the ground fabric layer 31. That is, the artificial leather of the covering 30 has a two-layer structure.

The ground fabric layer 31 is formed by processing a cloth of knitted fabric or woven fabric of synthetic resin fibers such as polyester fibers and polyamide fibers.

Figure 7:
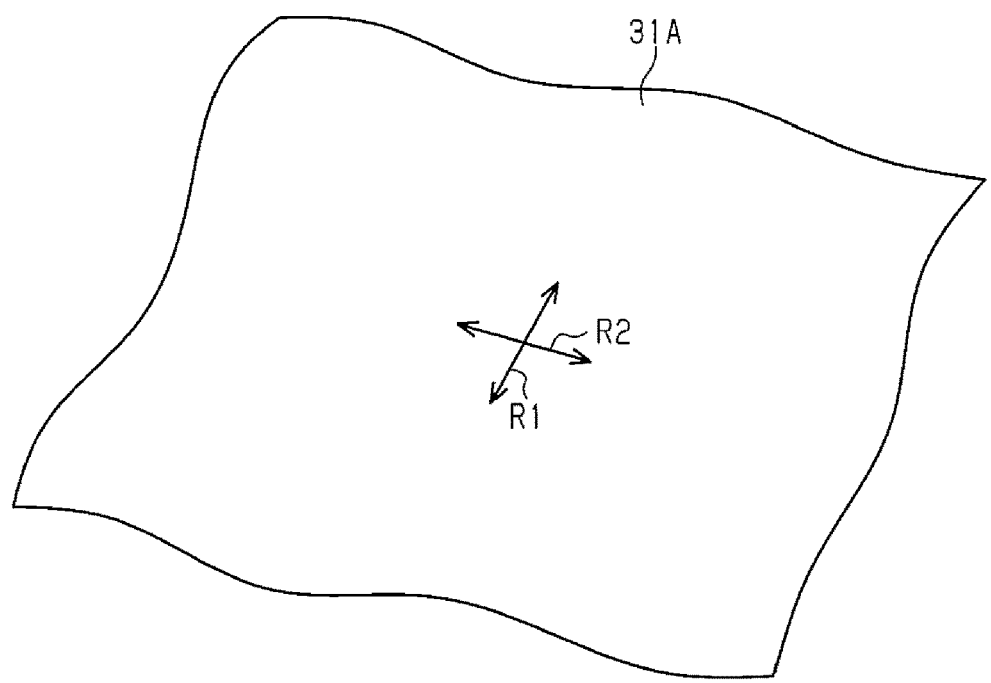
FIG. 7 is a diagram showing the anisotropy in the tensile strength of the ground fabric layer of the embodiment.

As shown in FIG. 7, an original fabric 31A of the ground fabric layer 31 has anisotropy of the tensile strength in directions along the surface. That is, the tensile strength of the original fabric 31A is set to be the smallest in a specific direction R1 along the surface and is set to be the greatest in another direction R2, which is perpendicular to the direction R1.

As shown in FIG. 5A, the covering layer 32 constitutes the outer surface of the airbag door 50, or an ornamental surface, and is made of, for example, polyurethane. The covering layer 32 is bonded to the ground fabric layer 31.

The covering 30, which is constituted by the ground fabric layer 31 and the covering layer 32, preferably has a thickness in the range from 0.3 mm to 1.0 mm. If the thickness of the covering 30 were less than 0.3 mm, it would be difficult to ensure a sufficient strength when the covering 30 is bonded to the surface of the three-dimensionally knitted cushion layer 20. If the thickness of the covering 30 were greater than 1.0 mm, it would be difficult to allow the covering 30 to be torn in a favorable manner. The cover 30 more preferably has a thickness in the range from 0.4 mm to 0.7 mm.

If the thickness of the covering 30 is set to be in the range from 0.3 mm to 1.0 mm, the tearing load of the covering 30 will be less than the conventional structure.

The ground fabric layer 31 and the three-dimensionally knitted cushion layer 20 are bonded to each other while the orientations are adjusted such that directions R1 in which the tensile strengths are smallest agree with each other. Thus, the tensile strengths of the ground fabric layer 31 and the three-dimensionally knitted cushion layer 20 are smallest in the direction R1.

<Regarding General Structure of Airbag Module AM>

As shown in FIG. 4, a retainer 40 is provided on the back side of the airbag door 50. The retainer 40 has front-side and rear-side wall portions 41, which are arranged in the front-rear direction to face each other with a space in between, and left-side and right-side wall portions (not shown), which are arranged in the car width direction to face each other with a space in between. The front-side and rear-side wall portions 41 hold the airbag 62 in a folded state and an inflator 63 for generating and supplying inflation gas to the airbag 62. The retainer 40, the airbag 62, and the inflator 63 constitute the airbag module AM.

As shown in FIG. 4, a first extended portion 42A, which extends forward along the back of the airbag door 50, and a front-side door portion 43, which extends rearward via a first hinge portion 431, are coupled to the top-side end of the front-side wall portion 41. A second extended portion 42B, which extends rearward along the back of the airbag door 50, and a rear-side door portion 44, which extends forward via a second hinge portion 441, are coupled to the top-side end of the rear-side wall portion 41.

Figure 3:
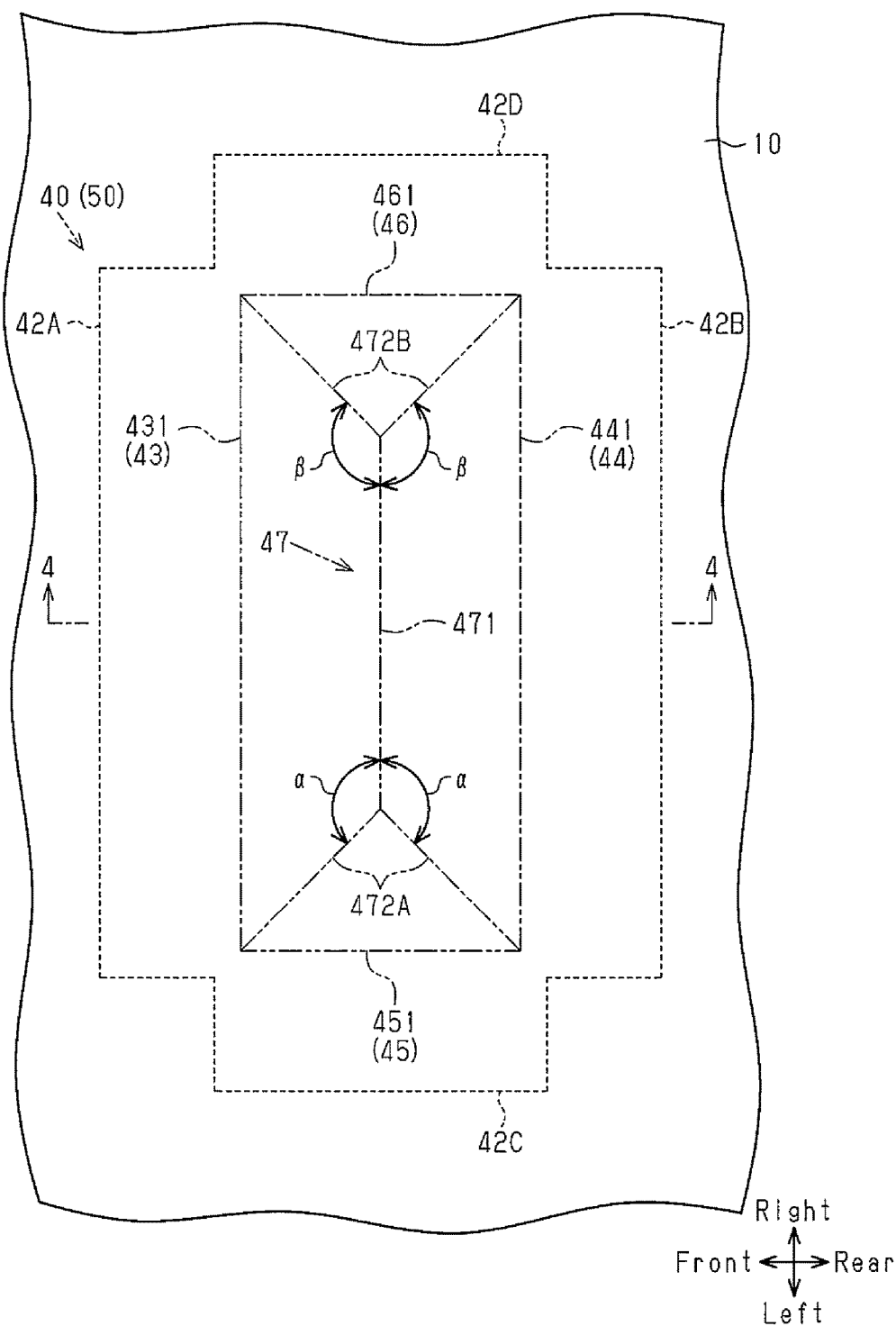
FIG. 3 is a partial plan view of the airbag door and its surroundings in the instrument panel of the embodiment.

As shown in FIGS. 3 and 4, a first groove 471 of a through-groove 47, which extends in the car width direction, is located between the front-side door portion 43 and the rear-side door portion 44.

As shown in FIG. 3, a third extended portion 42C and a left-side door portion 45 are coupled to the top-side end of the left-side wall portion (not shown). The third extended portion 42C extends leftward along the back of the airbag door 50, and the left-side door portion 45 extends rightward via a third hinge portion 451. A fourth extended portion 42D, which extends rightward along the back of the airbag door 50, and a right-side door portion 46, which extends leftward via a fourth hinge portion 461, are coupled to the top-side end of the right-side wall portion (not shown).

A pair of V-shaped second grooves 472A is formed on the left end of the first groove 471 in the car width direction. A pair of V-shaped third grooves 472B is formed on the right end of the first groove 471 in the car width direction. The second grooves 472A and the third grooves 472B are through grooves. The second grooves 472A and the third grooves 472B extend outward from the opposite ends of the first groove 471 in a spreading manner in the front-rear direction. The front one of the two second grooves 472A is located at the boundary between the front-side door portion 43 and the left-side door portion 45. The rear one of the two second grooves 472A is located at the boundary between the rear-side door portion 44 and the left-side door portion 45. The front one of the two third grooves 472B is located at the boundary between the front-side door portion 43 and the right-side door portion 46. The rear one of the two third grooves 472B is located at the boundary between the rear-side door portion 44 and the right-side door portion 46.

Further, the angle α defined by the first groove 471 and each second groove 472A is set to an obtuse angle. The angle β defined by the first groove 471 and each third groove 472B is set to an obtuse angle. Such settings of angles are employed to utilize the force by which a first cleavage groove 121 is torn from the center in the car width direction toward the outer sides to smoothly tear, so that second and third cleavage grooves 122A, 122B are smoothly torn. The cleavage grooves 121, 122A, 122B will be discussed below. In the present embodiment, the angles α and β are all set to 135 degrees.

The retainer 40, which has the above described configuration, is made of, for example, thermoplastic olefin (TPO) by injection molding. As shown in FIG. 5A, a plurality of protrusions 432 are formed on the surface of the front-side door portion 43, and a plurality of protrusions 442 are formed on the surface of the rear-side door portion 44. FIG. 5A illustrates one of the protrusions 432 and one of the protrusions 442. Protrusions (not shown) similar to those on the front-side door portion 43 and the rear-side door portion 44 are formed on the surfaces of the first to fourth extended portions 42A, 42B, 42C, 42D, the left-side door portion 45, and the right-side door portion 46. The protrusions 432, 442 are fixed to the back of the base member 11 of the airbag door 50, for example, by vibration-welding.

<Regarding Tear Line TL>

Figure 8:
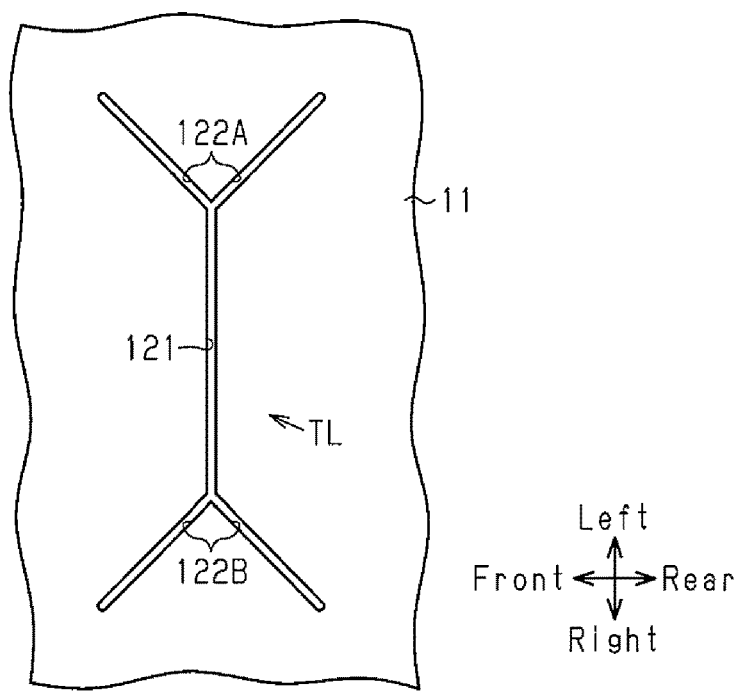
FIG. 8 is a partial plan view of the back of the base member of the embodiment, showing a part around the tear line.

As shown in FIGS. 5A and 8, a tear line TL is formed in the back of the base member 11. As shown in FIG. 5A, the tear line TL is formed by a first cleavage groove 121, which extends in the car width direction, a pair of second cleavage groove 122A, which extends from the left end of the first cleavage groove 121, a pair of third cleavage groove 122B, which extends from the right end of the first cleavage groove 121. The tear line TL is located on the top side of the through-groove 47 of the retainer 40. One of the second cleavage grooves 122A extends outward in the car width direction and diagonally forward, and the other second cleavage groove 122A extends outward in the car width direction and diagonally rearward, so that the two second cleavage grooves 122A form a V-shape. One of the third cleavage grooves 122B extends outward in the car width direction and diagonally forward, and the other third cleavage groove 122B extends outward in the car width direction and diagonally rearward, so that the two third cleavage grooves 122B form a V-shape. Thus, the parts of the base member 11 where the first cleavage groove 121, the second cleavage grooves 122A, and the third cleavage grooves 122B are formed are thinner than the remaining parts and have a lower strength. As shown in FIG. 5A, the first cleavage groove 121 has a trapezoidal cross-sectional shape with the width decreasing toward the top side. In the present embodiment, the width of the first cleavage groove 121 on the top side is set to 1.0 mm. The second cleavage grooves 122A and the third cleavage grooves 122B each have a similar cross-sectional shape as that of the first cleavage groove 121.

In contrast, the cover member 15 of the present embodiment (the three-dimensionally knitted cushion layer 20, the ground fabric layer 31, and the covering layer 32) has no cleavage grooves.

Figure 9:
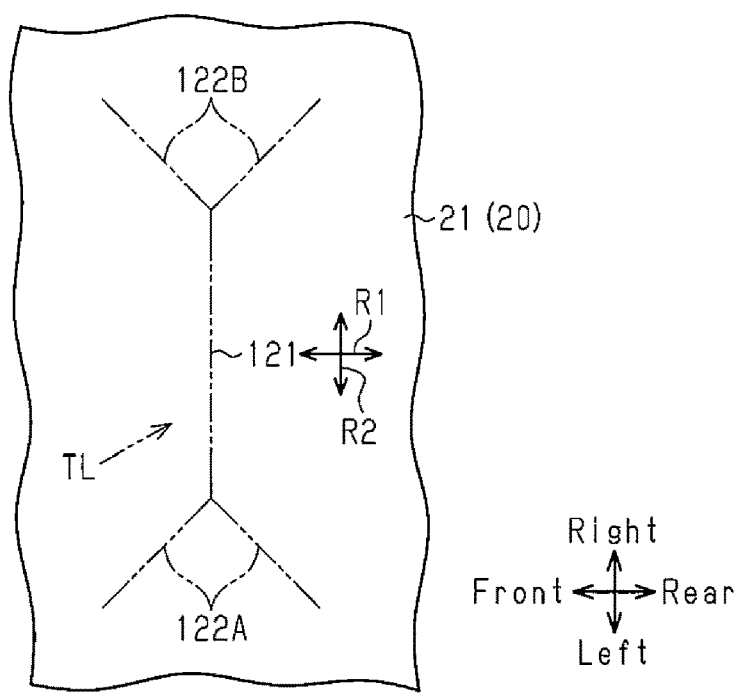
FIG. 9 is a partial plan view of the surface of the three-dimensionally knitted cushion layer of FIG. 6, showing the part in which the tear line is formed.

As shown in FIGS. 8 and 9, the tear line TL is configured such that the first cleavage groove 121 extends in the direction R2, in which the tensile strength of the three-dimensionally knitted cushion layer 20 is the greatest.

To open the airbag door 50, the tear line TL is pressed by the airbag 62 being deployed and inflated to become the starting point of tearing action of the airbag door 50. The tear line TL is provided for smoothly opening the airbag door 50 and ensuring smooth deployment and inflation of the airbag 62.

In the present embodiment, the tear line TL is configured such that, when the airbag door 50 is pressed by the airbag 62 being deployed and inflated, the first cleavage groove 121 is torn prior to the second cleavage grooves 122A and the third cleavage grooves 122B.

Characteristic features of the present embodiment will now be described.

Figure 5B:
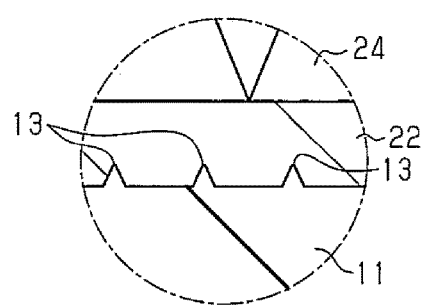
FIG. 5B is a partial cross-sectional view of section Y of FIG. 5A.
Figure 10:
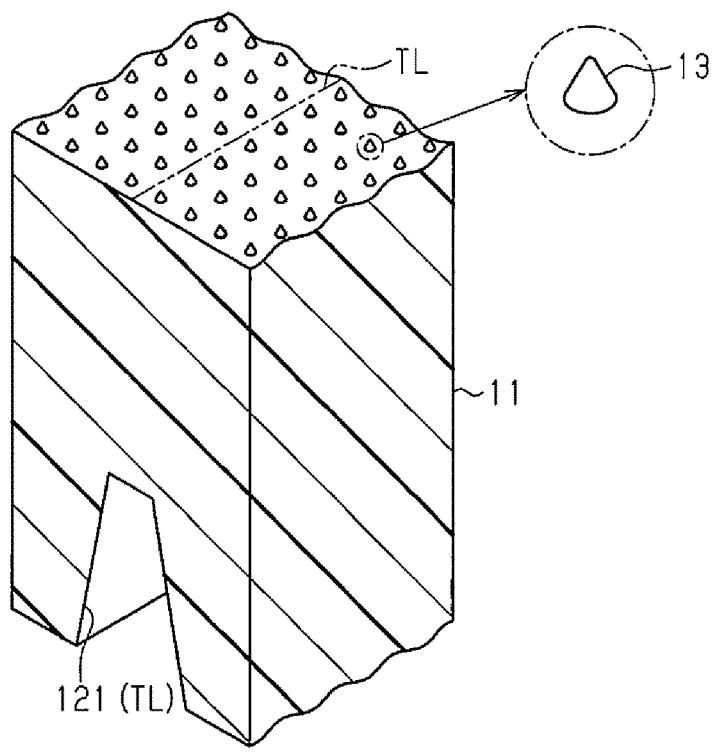
FIG. 10 is a cross-sectional perspective view of a plurality of projections formed on the surface of the base member of FIG. 8.

As shown in FIGS. 5B and 10, a plurality of conical projections 13 is formed on the entire surface of the base member 11. The distal ends of the projections 13 are rounded. The projections 13 preferably have heights in the range from 0.1 mm to 1.5 mm. The projections 13 more preferably have heights in the range from 0.1 mm to 0.8 mm. If the heights of the projections 13 were greater than 1.5 mm, the unevenness of the surface of the base member 11 due to the projections 13 would make the surface of the cover member 15 uneven, degrading the appearance of the airbag door 50. If the heights of the projections 13 were less than 0.1 mm, the projections 13 would have difficulty being caught in the back side of the three-dimensionally-knitted cushion layer 20, and the advantages discussed below would be difficult to achieve. In the present embodiment, the heights of the projections 13 are set to 0.15 mm.

In the present embodiment, the mass per unit area of the top-side knitted fabric layer 21 is set to be in the range from 50 g/m² to 500 g/m². Further, the mass per unit area of the back-side knitted fabric layer 22 is set to be in the range from 150 g/m² to 300 g/m². This is because if the mass per unit area of the back-side knitted fabric layer 22 were less than 150 g/m², the porosity of the back-side knitted fabric layer 22 would be increased so that the adhesive would be likely to leak into the back-side knitted fabric layer 22 and the connection layer 24, and the leaked adhesive might degrade the cushioning property (elasticity) of the three-dimensionally knitted cushion layer 20. On the other hand, if the mass per unit area of the back-side knitted fabric layer 22 were greater than 300 g/m², the tensile strength of the back-side knitted fabric layer 22 would be excessive and hamper smooth tearing of the back-side knitted fabric layer 22.

Operation of the present embodiment will now be described.

When the base member 11 is pressed by the airbag 62 being inflated and deployed, so that the base member 11 is torn from the tear line TL serving as the starting point, the projections 13, which are formed on the entire surface of the base member 11, are caught in the back side of the three-dimensionally knitted cushion layer 20. This hinders the three-dimensionally knitted cushion layer 20, or the cover member 15, from coming off the base member 11. Accordingly, the tensile stress acting on the cover member 15 easily concentrates on the part that corresponds to the tear line TL, allowing the cover member 15 to be easily torn along the tear line TL.

The automobile airbag door according to the above described embodiment has the following advantages.

(1) The projections 13 are formed on the entire surface of the base member 11.

The projections 13 include projections 13 adjacent to the tear line TL. When the base member 11 is pressed by an airbag being inflated and deployed, so that the base member 11 is torn from the tear line TL serving as the starting point, the projections 13 adjacent to the tear line TL are caught in the back side of the three-dimensionally cushion layer 20. This hinders the three-dimensionally knitted cushion layer 20, or the cover member 15, from coming off the base member 11. Accordingly, the tensile stress acting on the cover member 15 easily concentrates on the part that corresponds to the tear line TL, allowing the cover member 15 to be torn along the tear line TL. Thus, the cover member 15 is easily torn along the tear line TL in the base member 11 when pushed by the airbag 62 being deployed and inflated, without forming a tear line TL on the back side of the cover member 15. Further, the projections 13 are formed on the entire surface of the base member 11 in the present embodiment. Thus, the projections 13, which are formed on the entire surface of the base member 11, are caught in the back side of the cover member 15, which further hinders the cover member 15 from coming off the base member 11. Therefore, the tensile stress acting on the cover member 15 can be easily concentrated on the part of the cover member 15 that corresponds to the tear line TL.

(2) The mass per unit area of the back-side knitted fabric layer 22 is set to be in the range from 150 g/m² to 300 g/m².

Thus, the porosity of the back-side knitted fabric layer 22 is reduced, so that the adhesive is restrained from leaking into the back-side knitted fabric layer 22 and the connection layer 24. This reliably restrains deterioration of the cushioning property (elasticity) of the three-dimensionally knitted cushion layer 20 due to the adhesive. Since the tensile strength of the back-side knitted fabric layer 22 is prevented from excessively increasing, the back-side knitted fabric layer 22 can be smoothly torn.

<Modifications>

The above described embodiment may be modified as follows.

In the above illustrated embodiment, the projections 13 are formed to have the same heights. However, the projections 13 may be formed to have different heights. In this case, for example, the heights of the projections 13 closer to the tear line TL may be greater than those of the projections 13 farther from the tear line TL.

The three-dimensionally knitted cushion layer 20 does not necessarily have anisotropy of the tensile strength in directions along its surface.

The ground fabric layer 31 does not necessarily have anisotropy of the tensile strength in directions along its surface.

Figure 11:
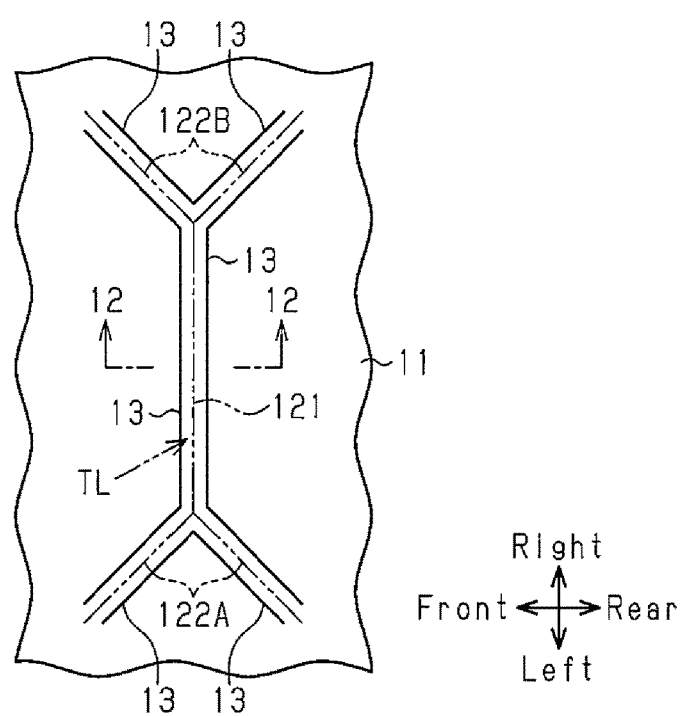
FIG. 11 is a partial plan view of the surface of the base member of a modification, showing the part in which the tear line is formed.
Figure 12:
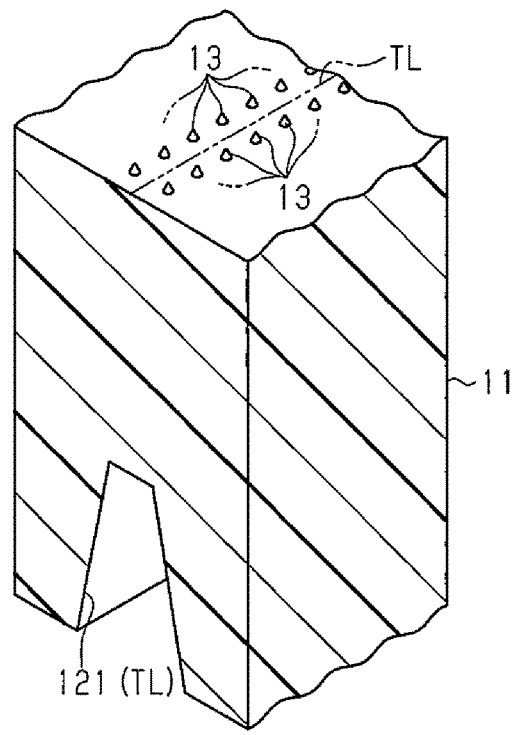
FIG. 12 is a cross-sectional perspective view taken along line 12-12 of FIG. 11.

As shown in FIGS. 11 and 12, a plurality of pairs of projections 13 may be formed on the opposite sides of the tear line TL on the surface of the base member 11, such that the projections 13 are arranged along the tear line TL. The projections 13 of the modification shown in FIGS. 11 and 12 have the same shape as that of the projections 13 in the above illustrated embodiment. In FIG. 11, the rows of the projections 13 are represented by solid lines.

Figure 13:
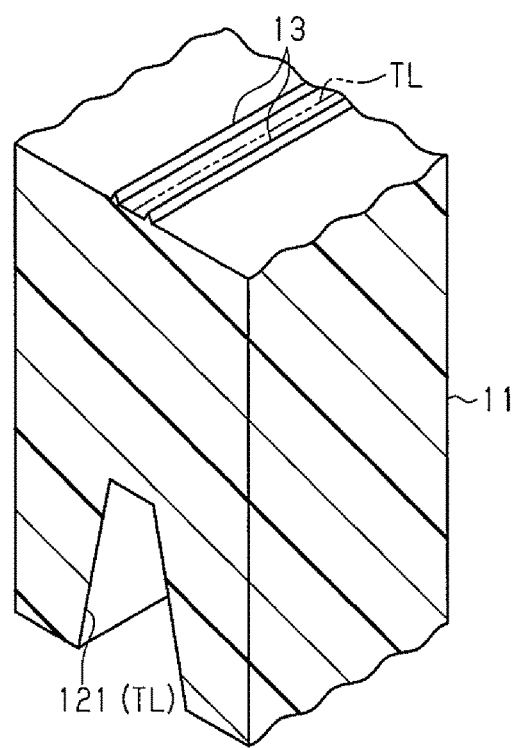
FIG. 13 is a cross-sectional perspective view showing a base member of a further modification.

As shown in FIG. 13, projections 13 that extend continuously along the tear line TL may be provided. Each projection 13 shown in FIG. 13 extends substantially along the entire length of the tear line TL and has a triangular cross-section.

Figure 14:
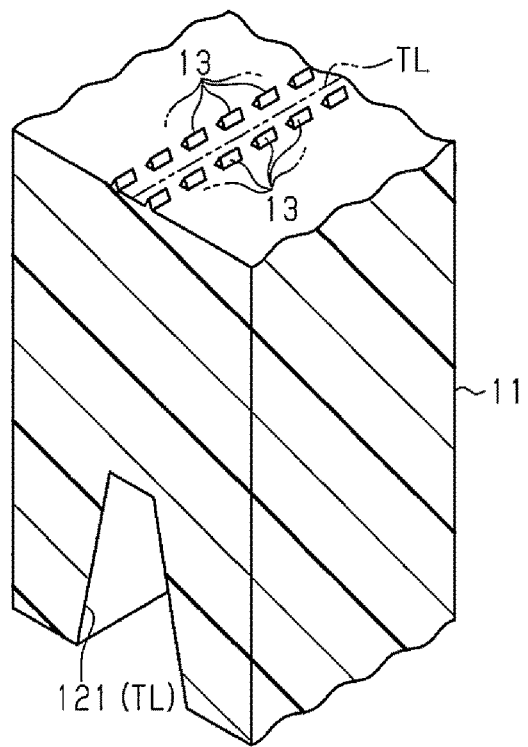
FIG. 14 is a cross-sectional perspective view showing a base member of a further modification.

As shown in FIG. 14, projections 13 may be intermittently arranged along the tear line TL.

In these cases, since the projections 13 are either continuously or intermittently arranged along the tear line TL, the cover member 15 is restrained from coming off the base member 11 in a wide area along the tear line TL. Also, since the projections 13 are arranged on the opposite sides of the tear line TL, the cover member 15 is restrained from coming off the base member 11 on both sides of the tear line TL. Thus, the tensile stress acting on the cover member 15 from the base member 11 can be easily concentrated on the part of the cover member 15 that corresponds to the tear line TL.

Figure 15:
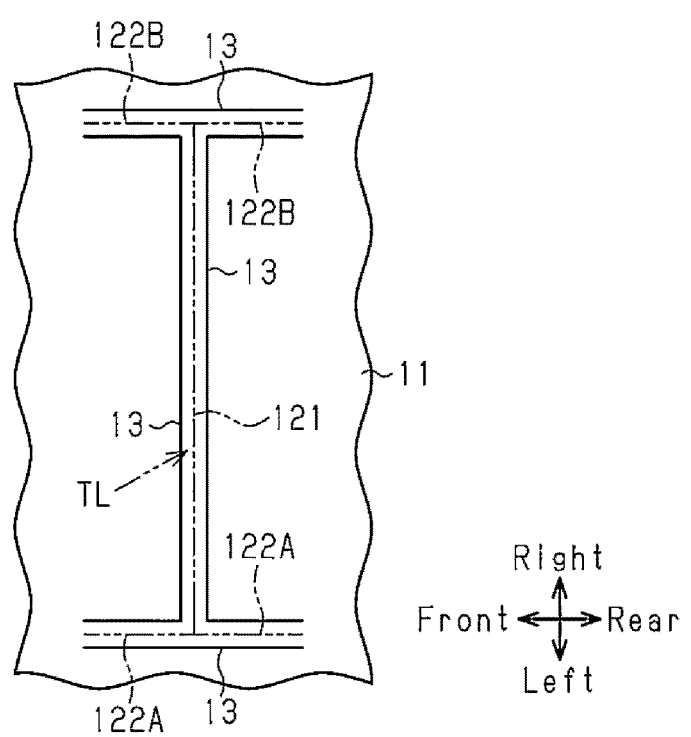
FIG. 15 is a partial plan view of the surface of the base member of a further modification, showing the part in which the tear line is formed.

As shown in FIG. 15, the tear line TL may be formed by a first cleavage groove 121, which extends in the car width direction, a pair of second cleavage grooves 122A, which extends forward and rearward from the left end of the first cleavage groove 121, and a pair of third cleavage grooves 122B, which extends forward and rearward from the right end of the first cleavage groove 121. That is, the tear line TL may be formed to have an H-shape. Even in this case, it is only necessary to form the projections 13 on the surface of the base member 11 to extend along and to be on both sides of the tear line TL.

Figure 16:
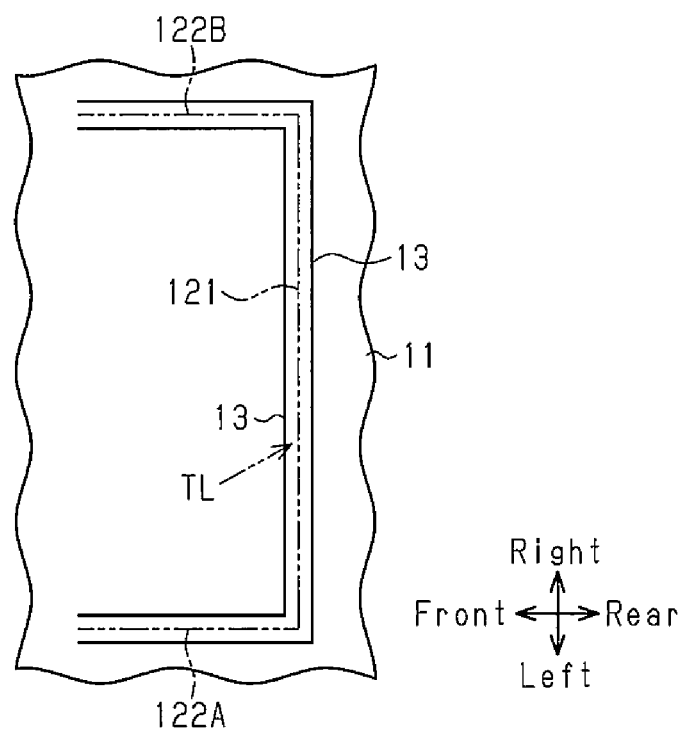
FIG. 16 is a partial plan view of the surface of the base member of a further modification, showing the part in which the tear line is formed.

As shown in FIG. 16, the tear line TL may be formed by a first cleavage groove 121, which extends in the car width direction, a second cleavage groove 122A, which extends forward from the left end of the first cleavage groove 121, and a third cleavage groove 122B, which extends forward from the right end of the first cleavage groove 121. That is, the tear line TL may be formed to have a U-shape. Even in this case, it is only necessary to form the projections 13 on the surface of the base member 11 to extend along and to be on both sides of the tear line TL.

The invention claimed is:

1. An automobile airbag door comprising:
   a base member having a surface and a back side;
   a cover member, which is bonded to the surface of the base member; and
   a tear line formed in the back side of the base member, wherein the tear line is configured to be a starting point of tearing when the base member is pressed by an airbag being deployed and inflated, wherein
   the cover member includes a three-dimensionally knitted cushion fabric layer, which is bonded to the surface of the base member, and
   a covering, which is bonded to a surface of the three-dimensionally knitted cushion layer, the base member includes at least one projection, which is formed on the surface of the base member and arranged to be adjacent to the tear line, and the at least one projection is one of a plurality of projections formed on an entire surface of the base member.

2. The automobile airbag door according to claim 1, wherein the at least one projection is one of two projections arranged on opposite sides of the tear line.

3. The automobile airbag door according to claim 1, wherein the three-dimensionally knitted cushion layer is constituted by a double-raschel knitted fabric.

4. The automobile airbag door according to claim 3, wherein
   the double-raschel knitted fabric includes
      a back-side knitted fabric layer, which is bonded to the surface of the base member with an adhesive,
      a top-side knitted fabric layer, to which a back side of the covering is bonded, and
      a connection layer, which connects the back-side knitted fabric layer and the top-side knitted fabric layer to each other, and
   a mass per unit area of the back-side knitted fabric layer is set to be in a range from 150 $g/m^2$ to 300 $g/m^2$.

* * * * *